United States Patent [19]

Druschke et al.

[11] Patent Number: 4,529,772
[45] Date of Patent: Jul. 16, 1985

[54] CONTACT ADHESIVE DISPERSIONS FOR THE PRODUCTION OF SELF-ADHESIVE ARTICLES, FOR EXAMPLE THOSE HAVING A POLYOLEFINIC BASE

[75] Inventors: Wolfgang Druschke, Dirmstein; Hans Kast, Mannheim; Alexander Zettl, Ludwigshafen, all of Fed. Rep. of Germany

[73] Assignee: BASF Aktiengesellschaft, Ludwigshafen, Fed. Rep. of Germany

[21] Appl. No.: 613,729

[22] Filed: May 24, 1984

[51] Int. Cl.$^3$ .................. C08G 67/00; C08G 18/10; C08G 69/00
[52] U.S. Cl. ..................... 524/555; 156/327; 156/331.8; 427/207.1; 427/208.2; 427/208.4; 427/388.4; 428/507; 526/310
[58] Field of Search ............ 156/327, 331.8; 427/207.1, 208.2, 208.4, 388.4; 524/555; 526/310; 428/507

[56] References Cited

U.S. PATENT DOCUMENTS

| | | | |
|---|---|---|---|
| 3,345,336 | 10/1967 | Kuhlkamp et al. | 525/376 |
| 4,061,845 | 12/1977 | Fabris et al. | 156/331.8 |
| 4,152,189 | 5/1979 | Guerin et al. | 427/208.4 |
| 4,210,565 | 7/1980 | Emmons | 524/560 |
| 4,230,772 | 10/1980 | Swift et al. | 428/442 |
| 4,267,091 | 5/1981 | Geelhaar et al. | 524/189 |
| 4,396,738 | 8/1983 | Powell et al. | 524/555 |

FOREIGN PATENT DOCUMENTS

| | | |
|---|---|---|
| 0003516 | 8/1979 | European Pat. Off. |
| 0005617 | 11/1979 | European Pat. Off. |
| 0039797 | 11/1981 | European Pat. Off. |

*Primary Examiner*—Ronald W. Griffin
*Attorney, Agent, or Firm*—Oblon, Fisher, Spivak, McClelland & Maier

[57] ABSTRACT

Contact adhesive dispersions contain
(A) an aqueous dispersion of a copolymer A which has a glass transition temperature below 0° C. and consists of
  (a) from 50 to 99% by weight of esters of acrylic acid with non-tertiary alkanols,
  (b) from 0 to 50% by weight of esters of acrylic or methacrylic acid and/or vinyl esters and/or (meth-)acrylonitrile and/or styrene and/or tert.-butyl acrylate,
  (c) from 0.5 to 5% by weight of monoolefinically unsaturated carboxylic acids and/or their amides which are unsubstituted or substituted at the nitrogen atoms by alkyl and/or alkylol radicals, and/or hydroxyalkyl (meth)acrylates, and
  (d) from 0.5 to 5% by weight of carbonyl-containing monomers and
(B) from 0.05 to 2 moles of a water-soluble dihydrazine compound per mole of carbonyl groups present in the copolymer A.

8 Claims, No Drawings

CONTACT ADHESIVE DISPERSIONS FOR THE PRODUCTION OF SELF-ADHESIVE ARTICLES, FOR EXAMPLE THOSE HAVING A POLYOLEFINIC BASE

Contact adhesives obtained from synthetic raw materials are increasingly being used for the production of self-adhesive articles. Materials which serve as bases for the production of such self-adhesive articles include paper, and films of metal, polyethylene, polypropylene, polyethylene terephthalate or PVC.

At present, PE and PP films are the most economical ones and also have satisfactory properties (PE film is flexible and elastic, but biaxially oriented PP film is hard and has a high tensile strength). Hence, these polyolefin films are particularly suitable for coating with self-adhesive compositions. However, they have disadvantageous adhesion properties, preventing adequate adhesion of coatings, printing inks or adhesives. There are various conventional processes (corona pretreatment, chemical treatment, flame treatment) for producing polar groups at the polyolefin surfaces, these groups then providing a certain degree of adhesion. In particular, corona pretreatment is used in practice, and this method also gives quite useful results for some applications.

To date, such self-adhesive articles with a polyolefinic base have been produced in practice predominantly using contact adhesive solutions based on natural or synthetic rubber, which have been modified with flexible resins and/or plasticizers and form a flexible, very tacky film. To improve the adhesion to the polyolefinic surface, adhesion promoters are applied before application of the contact adhesive. The solvents used are, for example, gasoline, toluene, acetone and ethyl acetate. The preparation of such adhesive solutions is technically complicated since, for example, the natural rubber components have to be masticated on a roll mill or a kneader, and the elastomers have to be dissolved in the organic solvents, using a dissolving kneader or a dissolver. Furthermore, the solvents used are inflammable substances, so that, when the adhesive solutions are used, the coating plants have to be protected against explosion, and downstream solvent recovery units are required. Further particular disadvanges of such conventional adhesives are their low aging resistance, a relatively rapid graying of the label surface as a result of plasticizer migration, a pronounced increase in adhesion on non-polar surfaces, eg. on polyethylene, and problems during printing and embossing of the labels as a result of cobwebbing of the adhesive.

German Laid-Open Application DOS No. 3,018,131 discloses that solutions of polyacrylates and polyisocyanates in organic solvents can be used for the production of peelable self-adhesive labels, but in this case too disadvantages of the abovementioned nature occur owing to the use of organic solvents. Furthermore, because they contain reactive polyisocyanates, mixtures of this type have a relatively short pot life, and the adhesion properties are dependent on the humidity and therefore not readily reproducible.

The disadvantages encountered during processing of solvent-containing adhesives can frequently be avoided by using aqueous polymer dispersions. Hence, aqueous contact adhesive dispersions have been employed for the production of self-adhesive articles having a polyolefinic base. Such dispersions of conventional flexible and tacky acrylate copolymers provide sufficient adhesion for some applications. However, anchoring to the film is inadequate in the case of demanding applications and requirements. For example, in a high-quality self-adhesive tape, there should be no signs of detachment from the film even after adhesive layers have been repeatedly stuck on top of one another and peeled apart. Furthermore, a self-adhesive tape stored under various conditions and unrolled at various speeds should show no signs of transfer of adhesive to the reverse side. A very important requirement for some applications is the possibility of peeling off the self-adhesive tape or the self-adhesive film, which has been stuck for a long time, from various surfaces (metal, plastic, glass, etc.), without leaving any residue. The conventional acrylate copolymer dispersions do not meet these requirements.

We have found that contact adhesive dispersions which comprise (A) a 40–70% strength aqueous dispersion of a copolymer A which has a glass transition temperature below 0° C. and consists of
  (a) from 50 to 99% by weight of one or more esters of acrylic acid with non-tertiary alkanols of 4 to 8 carbon atoms,
  (b) from 0 to 50% by weight of esters of acrylic or methacrylic acid with alkanols of 1 to 3 carbon atoms and/or vinyl esters of carboxylic acids of 2 to 4 carbon atoms and/or (meth)acrylonitrile and/or styrene and/or tert.-butyl acrylate,
  (c) from 0.5 to 5% by weight of monoolefinically unsaturated mono- and/or dicarboxylic acids of 3 to 5 carbon atoms and/or their amides which are unsubstituted or substituted at the nitrogen atoms by alkyl and/or alkylol radicals of 1 to 4 carbon atoms, and/or hydroxyalkyl (meth)acrylates where alkyl is of 2 to 5 carbon atoms, and
  (d) from 0.5 to 5% by weight of carbonyl-containing monomers, and
(B) from 0.05 to 2 moles of a water-soluble aliphatic dihydrazine compound per mole of carbonyl groups present in the copolymer A, exhibit very good adhesion to polyolefinic surfaces and are therefore particularly useful for the production of self-adhesive articles having a polyolefinic base, eg. protective films, self-adhesive tapes and self-adhesive films.

The reaction of carbonyl-containing polymers with polyfunctional hydrazine derivatives, as a process for the preparation of crosslinked polymers, has been described in a number of patents. According to U.S. Pat. No. 3,345,336, polymers containing keto groups are reacted with polyfunctional carboxylic acid hydrazides; U.S. Pat. No. 4,210,565 describes the crosslinking of aldehyde-containing polymers with polyfunctional carboxylic acid hydrazides or hydrazones; and European Pat. No. 3516 demonstrates that carbonyl-containing copolymers can generally be crosslinked with polyfunctional organic hydrazine derivatives in the presence of heavy metal salts. The crosslinking renders polymers of this type insoluble in organic solvents, and they are therefore preferably used as binders for paints and coatings (European Pat. No. 5617) and as binders for nonwoven fibrous materials.

Polymers which are crosslinked in this manner are generally not very suitable for the preparation of contact adhesives, since the crosslinking substantially reduces the surface tackiness, which is the essential characteristic of such systems.

The excellent adhesion of the self-adhesive films produced from the above components on film bases, which is observed in the present case, bears no relation to the conventional crosslinking of the polymer by covalent bonding between the polymer chains: in fact, polymers which have a similar composition and are crosslinked with the aid of other reactive components do not exhibit any useful adhesion to film bases (cf. Comparative Example 21). Moreover, it has been observed that the combination of carbonyl-containing polymers with polyfunctional hydrazine derivatives has an advantageous effect on the adhesion even when the composition differs substantially from the equimolar ratio of carbonyl groups to hydrazine groups which is optimum for crosslinking (cf. Example 3), ie. under conditions which are in fact adverse for crosslinking. Hence, the novel contact adhesion dispersions give contact adhesive coatings which have surprising properties.

The aqueous dispersions of copolymer A can be prepared in a conventional manner by copolymerization of the monomers in aqueous emulsion, using the conventional emulsifiers and dispersants, and have a concentration of copolymer A of from 40 to 70% by weight. They generally contain from 0.2 to 3% by weight, based on the amount of copolymers A, of anionic and/or non-ionic emulsifiers, such as sodium dialkylsulfosuccinates, sodium salts of sulfated oils, sodium salts of alkylsulfonic acids, sodium, potassium and ammonium alkylsulfates, alkali metal salts of sulfonic acids, alkali metal salts of oxyalkylated $C_{12}$–$C_{24}$ fatty alcohols and of oxyalkylated alkylphenols, polyadducts of alkylene oxides, in particular ethylene oxide and/or propylene oxide, with fatty acids, fatty alcohols, fatty amides and/or alkylphenols, and sodium salts of fatty acids, eg. sodium stearate and sodium oleate. The copolymers A have a glass transition temperature of less than 0° C., preferably from −40° to −10° C., determined by a conventional method, for example by measuring the modulus of elasticity as a function of temperature in the creep test, or by means of differential thermal analysis (DTA).

The copolymers contain, as soft comonomers (a), preferably 2-ethylhexyl acrylate and/or isooctyl acrylate and/or n-butyl acrylate, although other suitable copolymers are those which contain, as copolymerized monomers (a), isobutyl acrylate, hexyl acrylate and/or n-octyl acrylate.

The copolymers A contain, as copolymerized monomers (b), esters of acrylic and/or methacrylic acid with alkanols of 1 to 3 carbon atoms, such as methanol, ethanol, isopropyl alcohol or n-propanol, and/or vinyl esters of carboxylic acids of 2 to 4 carbon atoms, such as vinyl acetate, vinyl propionate and vinyl n-butyrate, and/or (meth)acrylontrile and/or styrene and/or its alkyl-substituted derivatives and/or t-butyl acrylate.

The copolymers A contain, as copolymerized monomers (c), from 0.5 to 5, preferably from 1 to 4, % by weight of, for example, acrylic acid, methacrylic acid, maleic acid, acrylamide, methacrylamide, N-methylacrylamide, N-isobutylacrylamide, N-methylmethacrylamide, N-methylolacrylamide, N-methylolmethacrylamide, N-ethoxymethylacrylamide, N-butoxymethylacrylamide, N-isopropoxyethylacrylamide, 2-hydroxyethyl acrylate, 2-hydroxyethyl methacrylate, 4-hydroxybutyl acrylate, 4-hydroxybutyl methacrylate, hydroxypropyl acrylate or hydroxypropyl methacrylate.

A characteristic feature of the copolymers A is the fact that they contain, as copolymerized units, from 0.5 to 5% by weight of carbonyl-containing monomers. For the purposes of the present invention, carbonyl-containing monomers are not, for example, esters, such as ethyl acrylate or vinyl acetate, or amides, such as acrylamide, or carboxylate acids, such as acrylic acid, but monomers containing one or more aldo or keto groups and a polymerizable double bond.

Particularly important compounds are acrolein, diacetoneacrylamide, formylstyrene, vinyl alkyl ketones, preferably of 4 to 7 carbon atoms, in particular vinyl methyl ketone, vinyl ethyl ketone and vinyl isobutyl ketone, and/or (meth)acryloxyalkylpropanals of the general formula (I)

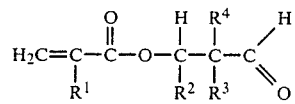

where $R^1$ is —H or —$CH_3$, $R^2$ is —H or alkyl of 1 to 3 carbon atoms, $R^3$ is alkyl of 1 to 3 carbon atoms and $R^4$ is alkyl of 1 to 4 carbon atoms. Such (meth)acryloxyalkylpropanals can be prepared by the process described in British Pat. No. 1,601,077, by esterifying a β-hydroxyalklpropanal of the general formula (II)

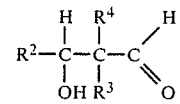

where $R^2$, $R^3$ and $R^4$ have the meanings given for the general formula (I), in the presence of an inert diluent and small amounts of sulfonic acids and mineral acids, at from 40° to 120° C., in particular from 60° to 90° C. Other suitable monomers carrying keto groups are diacetone acrylate, acetonyl acrylate, diacetone (meth)acrylate, 2-hydroxypropyl acrylate acetyl acetate and butane-1,4-diol acrylate acetyl acetate. The amount of carbonyl-containing or keto-containing copolymerized monomers (d) is preferably from 1 to 5% by weight, based on the copolymers A.

The novel contact adhesive dispersions contain from 0.05 to 2, preferably from 0.5 to 1.5, moles of water-soluble dihydrazine compounds per mole of carbonyl or keto groups present in the copolymer A. Particularly suitable dihydrazine compounds B are those of aliphatic dicarboxylic acids of 2 to 10, in particular 4 to 6, carbon atoms, eg. oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, eg. ethylene-1,2-dihydrazine, propylene-1,3-dihydrazine or butylene-1,4-dihydrazine, are also suitable.

The novel contact adhesive dispersions can contain, as additives, conventional amounts of thickeners, stabilizers, wetting agents, water repellents, plasticizers, resins which impart tackiness and/or pigments. The contact adhesives can be applied onto one or both sides of the substrate by a conventional method, for example by spraying, knife-coating, roller-coating with a steel or rubber roller or with a roller covered with a soft absorbent material, casting or dipping. The contact adhesive can also be applied by an indirect method, for example by the transfer method using a siliconized paper. After application of the adhesive, the coated substrate is dried in a conventional manner.

The novel contact adhesives are preferably used for the production of self-adhesive tapes and films having a polyolefinic base, but can also be used for the manufacture of self-adhesive labels and other self-adhesive articles. Apart from films of polyolefins, eg. polyethylene and polypropylene, suitable bases include films of polyethylene glycol terephthalate, PVC and metal, and paper.

In the Examples which follow, testing of the adhesive properties is carried out as follows: the contact adhesive is applied by knife-coating onto a 40 μm thick polypropylene film which has been subjected to a conventional corona pretreatment, the thickness of the dry film corresponding to about 20 g/m². The coated film is dried for 3 minutes at 70° C. in a drying oven, and is then cut into 2 cm wide test strips.

To determine the cohesion, 2 cm lengths of the test strips are stuck on a V2A stainless steel sheet, stored for 24 hours and then suspended at 50° C. while subjected to a load from a 1 kg weight. The time taken for the weight to fall is a measure of the shear strength.

In determining the peeling resistance, the adhesive strips are applied onto a chrome-plated brass sheet, allowed to remain stuck for 10 minutes and then peeled off in a tensile test apparatus at 23° C., at an angle of 180° and at a speed of 300 mm/min. The force in N required for the 2 cm wide strips is stated as a measure of the peeling resistance.

The adhesion to the polyolefinic surface is assessed as follows:
Base: 100 μm thick polyethylene film, freshly corona pretreated
Amount applied: 7 g/m², solid
Drying: 60 seconds at 70° C.
Tests: Adhesive layer on adhesive layer
  Rubbing off the adhesive layer by hand
  Rubbing off the adhesive layer after storage for 5 seconds in water.
All tests wer carried out after storage for 24 hours at 23° C. and after storage for 2 hours at 80° C.
Assessment:

1 = good adhesion of the adhesive layer to the film
4 = very poor adhesion of the adhesive layer to the film

PREPARATION OF THE POLYMER DISPERSIONS 22 parts by weight of water, 0.5 part by weight of potassium peroxydisulfate, 0.5 part by weight of the sodium salt of a reaction product of isooctylphenol with 25 moles of ethylene oxide, and 25 parts by weight of the particular monomer mixture (having the composition shown in Table 1) are heated to 85° C. in a reaction vessel equipped with a stirrer and feed vessels. After 15 minutes, an emulsion consisting of 200 parts by weight of water, 9.5 parts by weight of the above emulsifier and 475 parts by weight of the monomer mixture is fed in steadily in the course of 2 hours. At the same time, 2 parts by weight of potassium peroxydisulfate dissolved in 80 parts by weight of water are introduced as a separate feed. The contents of the reaction vessel are then kept at 85° C. for a further hour.

The mixture is cooled, the resulting dispersion is neutralized with 25% strength ammonia, and the amount of adipic acid dihydrazide stated in each Example (cf. Table 1), in 30 parts by weight of water, is then added.

EXAMPLES AND COMPARATIVE EXPERIMENTS

TABLE 1

| Example No. | Composition in % by weight | Amount of ADH in parts by weight |
|---|---|---|
| 1 (comparison) | 64.5 BA, 30 EHA, 3 AN, 1 AA, 1,5 DAAM | — |
| 2 | as in 1 | 3.8 |
| 3 | as in 1 | 5.7 |
| 4 (comparison) | 88 BA, 7 VAc, 2 AA, 3 DAAM | — |
| 5 | as in 4 | 7.5 |
| 6 (comparison) | 90 EHA, 6 AN, 1 AA, 3 MAc | — |
| 7 | as in 6 | 9.0 |
| 8 | as in 6 | 18.0 |
| 9 (comparison) | 39 BA, 50 EHA, 5 S, 2 AA, 4 DAAM | — |
| 10 | as in 9 | 5.0 |
| 11 | as in 9 | 10.0 |
| 12 (comparison) | 29 BA, 69 EHA, 5 MMA, 3 AA, 4 DAAM | — |
| 13 | as in 12 | 5.0 |
| 14 | as in 12 | 10.0 |
| 15 (comparison) | 88 EHA, 5 S, 2 AA, 5 DAAM | — |
| 16 | as in 15 | 6.3 |
| 17 | as in 15 | 12.5 |
| 18 (comparison) | 91 BA, 2MMA, 2 AA, 5 MAc | — |
| 19 | as in 18 | 15.5 |
| 20 | as in 18 | 31.0 |
| 21 (comparison) | 93 BA, 3 AN, 1 AA, 3 MAMol | — |

The results of measurements on the contact adhesive dispersions are summarized in Tables 2 and 3 below.
Abbreviations:
ADH = adipic acid dihydrazide
AN = acrylonitrile
AA = acrylic acid
BA = n-butyl acrylate
DAAM = diacetoneacrylamide
EHA = 2-ethylhexyl acrylate
MAc = methacrolein
MMA = methyl methacrylate
S = styrene
VAc = vinyl acrylate
MAMol = N-methylolmethacrylamide

TABLE 2

Results of the adhesion tests

| Example No. | Peeling resistance (N/2 cm) | Cohesion (hours) |
|---|---|---|
| 1 (comparison) | 2.8 A | 30 C |
| 2 | 0.7 A | 48 |
| 3 | 0.6 A | 48 |
| 4 (comparison) | 15.9 C | 1 C |
| 5 | 1.3 A | 48 |
| 6 (comparison) | 2.8 A | 48 |
| 7 | 0.6 A | 1 A |
| 8 | 0.5 A | 0.5 A |
| 9 (comparison) | 4.2 A | 31 C |
| 10 | 0.6 A | 48 |
| 11 | 0.4 A | 48 |
| 12 (comparison) | 5.0 A | 40 C |
| 13 | 0.6 A | 48 |
| 14 | 0.4 A | 48 |
| 15 (comparison) | 3.8 A | 100 C |
| 16 | 0.7 A | 48 |
| 17 | 0.6 A | 48 |
| 18 (comparison) | 2.2 A | 48 |
| 19 | 0.6 A | 20 A |
| 20 | 0.2 A | 6 A |
| 21 (comparison) | 2.5 A | 5 C |

A = Adhesive parts cleanly from substrate
C = Adhesive breaks

TABLE 3

Results of the adhesion tests

| Example No. | Testing after storage for 24 hours at 23° C. | | | Testing after storage for 2 hours at 80° C. | | |
|---|---|---|---|---|---|---|
| | Layer/layer | Rubbing off by hand | Rubbing off after storage for 5 seconds in water | Layer/layer | Rubbing off by hand | Rubbing off after storage for 5 seconds in water |
| 1 (comparison) | 4 | 4 | 4 | 4 | 4 | 4 |
| 2 | 1 | 1 | 1 | 1 | 1 | 1 |
| 3 | 1 | 1 | 1 | 1 | 1 | 1 |
| 4 (comparison) | 4 | 4 | 4 | 4 | 4 | 4 |
| 5 | 1 | 1 | 1–2 | 1 | 1 | 1–2 |
| 6 (comparison) | 3 | 3 | 3 | 3 | 3 | 3 |
| 7 | 1 | 1 | 2 | 1 | 1 | 2 |
| 8 | 1 | 1 | 2 | 1 | 1 | 1 |
| 9 (comparison) | 4 | 4 | 4 | 4 | 3 | 4 |
| 10 | 1 | 1 | 1–2 | 1 | 1 | 1 |
| 11 | 1 | 1 | 1 | 1 | 1 | 1 |
| 12 (comparison) | 4 | 4 | 4 | 4 | 4 | 4 |
| 13 | 1 | 1 | 1–2 | 1 | 1 | 1–2 |
| 14 | 1 | 1 | 1–2 | 1 | 1 | 1 |
| 15 (comparison) | 4 | 3 | 3 | 4 | 4 | 3 |
| 16 | 1 | 1 | 2 | 1 | 1 | 1–2 |
| 17 | 1 | 1 | 1–2 | 1 | 1 | 1 |
| 18 (comparison) | 3 | 4 | 4 | 4 | 3 | 4 |
| 19 | 1 | 1 | 2 | 1 | 1 | 2 |
| 20 | 1 | 1 | 2 | 1 | 1 | 2 |
| 21 | 4 | 4 | 3–4 | 4 | 4 | 4 |

We claim:

1. A contact adhesive dispersion for the production of self-adhesive articles, which comprises:
   (A) a 40–70% strength aqueous dispersion of a copolymer A which has a glass transition temperature of −40° C. to −10° C. and is prepared from
   (a) from 50–99% by weight of at least one ester of acrylic acid with non-tertiary alkanols of 4–8 carbon atoms,
   (b) from 0–50% by weight of esters of acrylic or methacrylic acid with alkanols of 1–3 carbon atoms, vinyl esters of carboxylic acids of 2–4 carbon atoms, (meth)acrylonitrile, styrene, tert.-butylacrylate, or combinations thereof,
   (c) from 0.5–5% by weight of monoolefinically unsaturated mono- and/or-dicarboxylic acids of 3–5 carbon atoms, the amides thereof, the amides thereof which are substituted at the nitrogen atom by alkyl and/or alkylol radicals of 1–4 carbon atoms, hydroxyalkyl (meth)acrylates where the hydroxyalkyl group is from 2–5 carbon atoms, or combinations thereof, and
   (d) from 0.5–5% by weight of carbonyl-containing monomers; and
   (B) from 0.05 to 2 moles of a water-soluble aliphatic dihydrazine compound per mole of carbonyl groups present in copolymer A.

2. The contact adhesive dispersion of claim 1, wherein said aqueous dispersion of copolymer A contains from 0.2 to 3% by weight, based on the amount of copolymer A, of an anionic emulsifier, a non-ionic emulsifier or mixtures thereof.

3. The contact adhesive dispersion of claim 1, wherein said ester of acrylic acid of component (a) is 2-ethylhexyl acrylate, isooctyl acrylate, n-butyl acrylate, isobutyl acrylate, hexyl acrylate, n-octyl acrylate, or mixtures thereof.

4. The contact adhesive dispersion of claim 1, wherein the amount of said monomeric component (c) ranges from 1–4% by weight of copolymer A.

5. The contact adhesive dispersion of claim 1, wherein said monomer component (c) is at least one member selected from the group consisting of acrylic acid, methacrylic acid, maleic acid, acrylamide, methacrylamide, N-methylacrylamide, N-isobutylacrylamide, N-methylmethacrylamide, N-methylolacrylamide, N-methylolmethacrylamide, N-ethoxymethylacrylamide, N-butoxymethylacrylamide, N-isopropoxyethylacrylamide, 2-hydroxyethyl acrylate, 2-hydroxyethyl methacrylate, 4-hydroxybutyl acrylate, 4-hydroxybutyl methacrylate, hydroxypropyl acrylate and hydroxypropylmethacrylate.

6. The contact adhesive dispersion of claim 1, wherein said carbonyl-containing monomer is selected from the group consisting of ethyl acrylate, vinyl acetate, acrylamide, acrylic acid, acrolein, diacetoneacrylamide, formylstyrene, vinyl alkyl ketone of 4 to 7 carbon atoms, a (meth)acryloxyalkylpropanal of the formula (I):

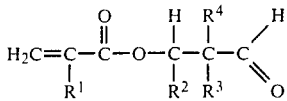

wherein $R^1$ is hydrogen or methyl, $R^2$ is hydrogen or alkyl of 1 to 3 carbon atoms, $R^3$ is alkyl of 1 to 3 carbon atoms and $R^4$ is alkyl of 1 to 4 carbon atoms.

7. The contact adhesive dispersion of claim 1, wherein the amount of said dihydrazine compound ranges from 0.5 to 1.5 moles per mole of carbonyl groups present in copolymer A.

8. The contact adhesive dispersion of claim 1, wherein said dihydrazine compound is oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, mixtures thereof, ethylene-1,2-dihydrazine, propylene 1,3-dihydrazine and butylene-1,4-dihydrazine.

* * * * *

UNITED STATES PATENT AND TRADEMARK OFFICE
CERTIFICATE OF CORRECTION

PATENT NO. : 4,529,772

DATED : July 16, 1985

INVENTOR(S) : DRUSCHKE et al.

It is certified that error appears in the above-identified patent and that said Letters Patent is hereby corrected as shown below:

On the title page;

THE PRIORITY INFORMATION HAS BEEN OMITTED; SHOULD READ AS FOLLOWS:

--[30] Federal Republic of Germany   P 33 19 240.5
   May 27, 1983--

Signed and Sealed this

Fifteenth Day of October 1985

[SEAL]

Attest:

Attesting Officer

DONALD J. QUIGG

Commissioner of Patents and
Trademarks—Designate